United States Patent
Di Guardo et al.

(10) Patent No.: US 7,688,044 B2
(45) Date of Patent: *Mar. 30, 2010

(54) DEVICE FOR TRANSFORMING AND STABILIZING A PRIMARY AC VOLTAGE FOR SUPPLYING AN ELECTRIC LOAD

(75) Inventors: Mario Di Guardo, Gravina di Catania (IT); Giovanni Mangraviti, Messina (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 29 days.

This patent is subject to a terminal disclaimer.

(21) Appl. No.: 12/058,089

(22) Filed: Mar. 28, 2008

(65) Prior Publication Data

US 2008/0238377 A1   Oct. 2, 2008

(30) Foreign Application Priority Data

Mar. 30, 2007   (IT)   .......................... VA2007A0036
Mar. 30, 2007   (IT)   .......................... VA2007A0037

(51) Int. Cl.
*G05F 1/40* (2006.01)
(52) U.S. Cl. .................. 323/225; 323/239; 323/284
(58) Field of Classification Search ................. 323/222, 323/225, 239, 240, 282, 284, 247
See application file for complete search history.

(56) References Cited

U.S. PATENT DOCUMENTS

| | | | | |
|---|---|---|---|---|
| 5,932,934 | A  * | 8/1999 | Hofstetter et al. | ............. 307/26 |
| 6,366,062 | B2 * | 4/2002 | Baretich et al. | ............. 323/223 |
| 7,288,904 | B2 * | 10/2007 | Numeroli et al. | ............. 315/312 |
| 2008/0239769 | A1 * | 10/2008 | Di Guardo et al. | ............. 363/37 |

* cited by examiner

*Primary Examiner*—Jessica Han
(74) *Attorney, Agent, or Firm*—Lisa K. Jorgenson; Allen, Dyer, Doppelt, Milbrath & Gilchrist, P.A.

(57) ABSTRACT

A device coupled to a primary AC voltage and a load includes an input, an inductive element coupled thereto, and a generator of a PWM control signal. A capacitor is coupled in parallel to the load. A first bidirectional switch couples the load and primary AC voltage during conduction phases. A second bidirectional switch discharges energy from the load during off phases of the first bidirectional switch. A first driving circuit for the second bidirectional switch, input with the PWM control signal, generates a first PWM signal applied between control and conduction terminals of the second bidirectional switch. A second driving circuit for the first bidirectional switch, input with the PWM control signal, generates a second PWM signal, in phase opposition with the first PWM signal, applied between control and conduction terminals of the first bidirectional switch. An electric decoupling circuit is between the generator and the second driving circuit.

16 Claims, 15 Drawing Sheets

US 7,688,044 B2

DEVICE FOR TRANSFORMING AND STABILIZING A PRIMARY AC VOLTAGE FOR SUPPLYING AN ELECTRIC LOAD

FIELD OF THE INVENTION

This invention relates to a device for converting and/or stabilizing an AC voltage for supplying and/or controlling an AC load.

BACKGROUND OF THE INVENTION

There are numerous boost converters capable of generating an AC voltage larger than a primary AC voltage (for example, the voltage of the mains). Typically, these converters comprise a first stage for rectifying the AC input voltage using, for example, a bridge of diodes, followed in cascade by a voltage booster realized according to one of innumerable circuit topologies of so-called "step-up" or "boost" type. In this type of inverter, energy stored in an inductor connected to the primary AC voltage (for example, the mains voltage) during a powering phase (Ton) of the periodic PWM driving signal, is supplied to the electric load through a free-wheeling switch of the inductance discharge current, thus raising the voltage on the supply terminals of the load.

Likewise, there are numerous switching converters that use buck-boost topologies that may be used also as AC voltage stabilizers. These converters carry out an AC-DC conversion of the AC mains voltage by using rectifying diodes and large capacitance electrolytic capacitors and a DC-AC conversion using classic buck-boost inverter topologies. These approaches, besides using a large number of power switches, use electrolytic capacitors that typically have a relatively short life. Moreover, in order to reduce distortion effects of the mains waveform, they typically have a power factor correction stage (PFC) realized with active circuits that use additional power switches.

SUMMARY OF THE INVENTION

An effective AC-AC voltage booster may be realized such as without a rectifying stage of the AC input voltage. The voltage booster of this approach obviates the issue of injection on the electrical mains of harmonics of the current, caused by the rectifying stage of the mains voltage that is present in prior art AC-AC converters.

This approach is based on the so-called "chopping" function typical of a switching converter, but applied instant-by-instant to the sinusoidal waveform of the primary voltage (for example, of the mains voltage) such as to generate through the load a current having the same waveform that it would have by connecting the load directly to the primary AC voltage.

The helpful bidirectionality of two switches driven in phase opposition by the PWM signal for chopping both the positive and the negative halfwaves of the primary AC voltage because of the absence of an input rectifying stage, may be obtained using monodirectional insulated gate switching devices (such as MOS or IGBT power transistors) connected to respective diode bridges such that the transistors and the respective diodes define bidirectional pairs.

The converter of this approach can be used in innumerable applications, for functioning as a transformer but being controllable for operating as a voltage booster, a step-down or a stabilizer of the input AC voltage (typically the mains voltage).

The device of this approach may be used as a stabilizer of a 50-60 Hz AC voltage for reducing problems due to, for example, mains voltage surges or abrupt drops, and for providing a stable sinusoidal voltage source. The control capacity of the output AC voltage to an upper value and to a lower value of the nominal input voltage, makes the versatile AC-AC converter of this approach suitable for many applications, differently from classic applications as a stabilizer.

The helpful bidirectionality of two switches driven in phase opposition by a PWM signal at a relatively high frequency (commonly of several tenths of KHz) with respect to the frequency of the input AC voltage (commonly of 50-60 Hz) may be obtained using monodirectional insulated gate switching devices (for example MOS or IGBT power transistors) connected to respective diode bridges, for making bidirectional each transistor and respective diode bridge.

DETAILED DESCRIPTION OF THE PREFERRED EMBODIMENTS

Figure 1:
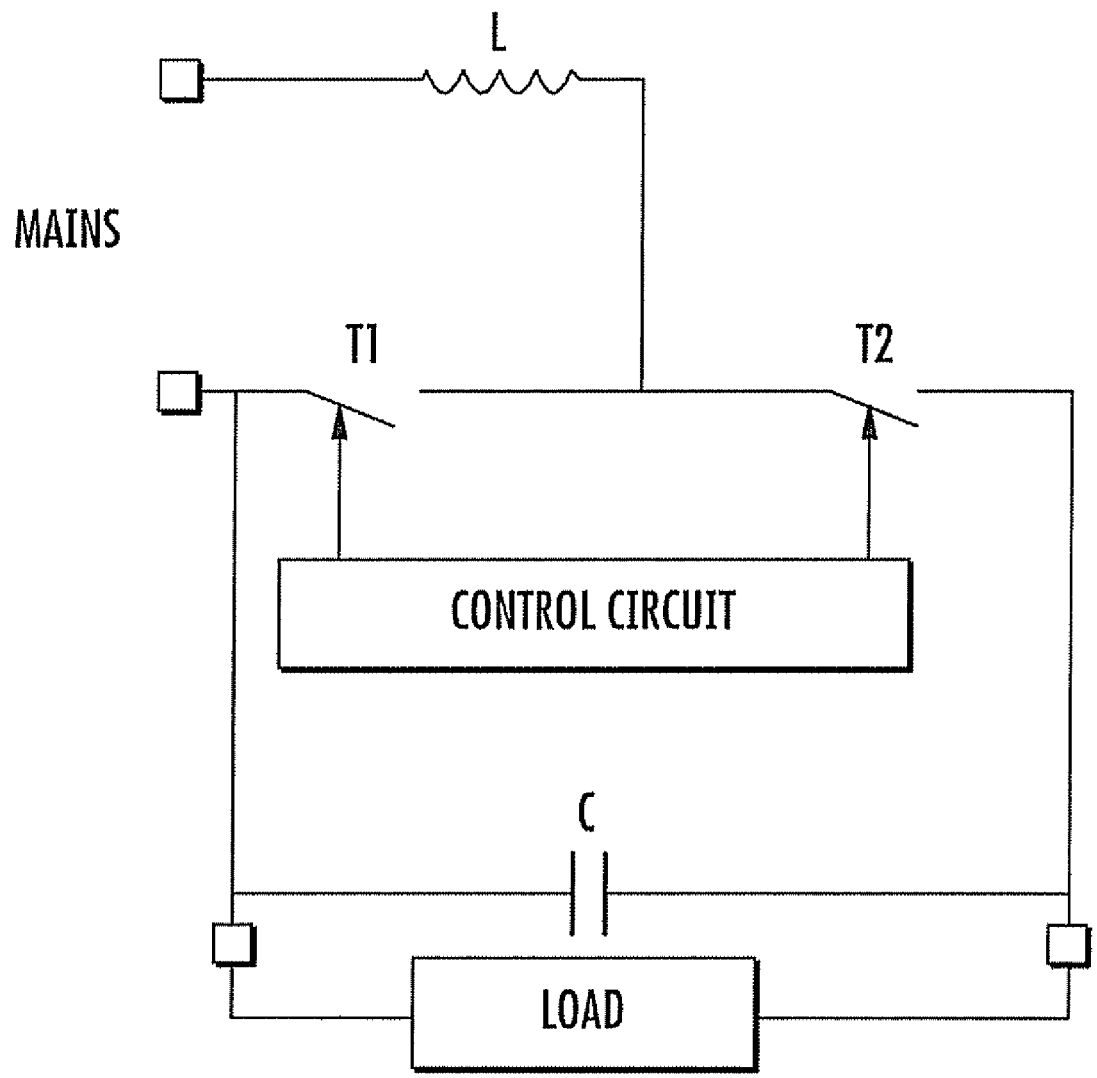
FIG. 1 depicts a basic architecture of the AC-AC voltage booster, in accordance with the present invention.

Referring to the basic diagram of FIG. 1, it may be shown that, neglecting power losses in the electronic devices, the circuit is such that the input (supplied) power S of the circuit equals the output (delivered) power:

$$S = V_{AC(rms)} I_{AC(rms)} = V_{LOAD(rms)} I_{LOAD(rms)}$$

and that the currents satisfy the following relation:

$$\frac{I_{LOAD(rms)}}{I_{AC(rms)}} = \frac{V_{AC(rms)}}{V_{LOAD(rms)}}$$

wherein $V_{AC}$ and $I_{AC}$ represent the source of the input voltage, AC SOURCE, and the AC current absorbed by the source, respectively, and $V_{LOAD}$ and $I_{LOAD}$ are the output voltage and the output current of the converter, respectively, that are delivered to the load, LOAD.

From the equations that tie the input and output currents and voltages (powers), neglecting the fact that the energy efficiency is less than one, it is possible to infer that the system modifies the power parameters. The circuit works as an AC-AC converter similarly to a traditional boost transformer.

In practice, the AC-AC converter has no exclusion on the type of load, it may work with any resistive and/or inductive load even with relevant phase angles φ between voltage and current.

δ being the duty-cycle of the PWM switching control signal, is given by the following equation:

$$\delta = \frac{ton}{ton + toff} = \frac{ton}{Ts}$$

wherein Ts is the fixed switching period of the PWM control signal, φ being the phase angle between the voltage and the current. The functioning of the AC-AC converter is described by the following equation:

$$v_{output}(t) = \frac{1}{1-\delta} \cdot V_{max} \cdot \sin(\omega t)$$

From the previous relation, for δ=0 the output voltage equals in amplitude and phase the input sinusoidal voltage; for δ>0 the output sinusoidal voltage has an rms value larger than that of the input voltage, but the two voltages are in phase to each other.

Similarly, neglecting the power dissipated in the electronic switching devices, it is possible to write the relation that ties the input and output current as follows:

$$i_{output}(t) = (1-\delta) \cdot I_{max} \cdot \sin(\omega t + \phi)$$

Dividing the input voltage by the current, the equivalent input impedance Zeq of the converter seen from the power source is:

$$Z_{eq} = \eta \cdot Z \cdot (1-\delta)^2$$

wherein η is the efficiency of the converter.

Figure 2:
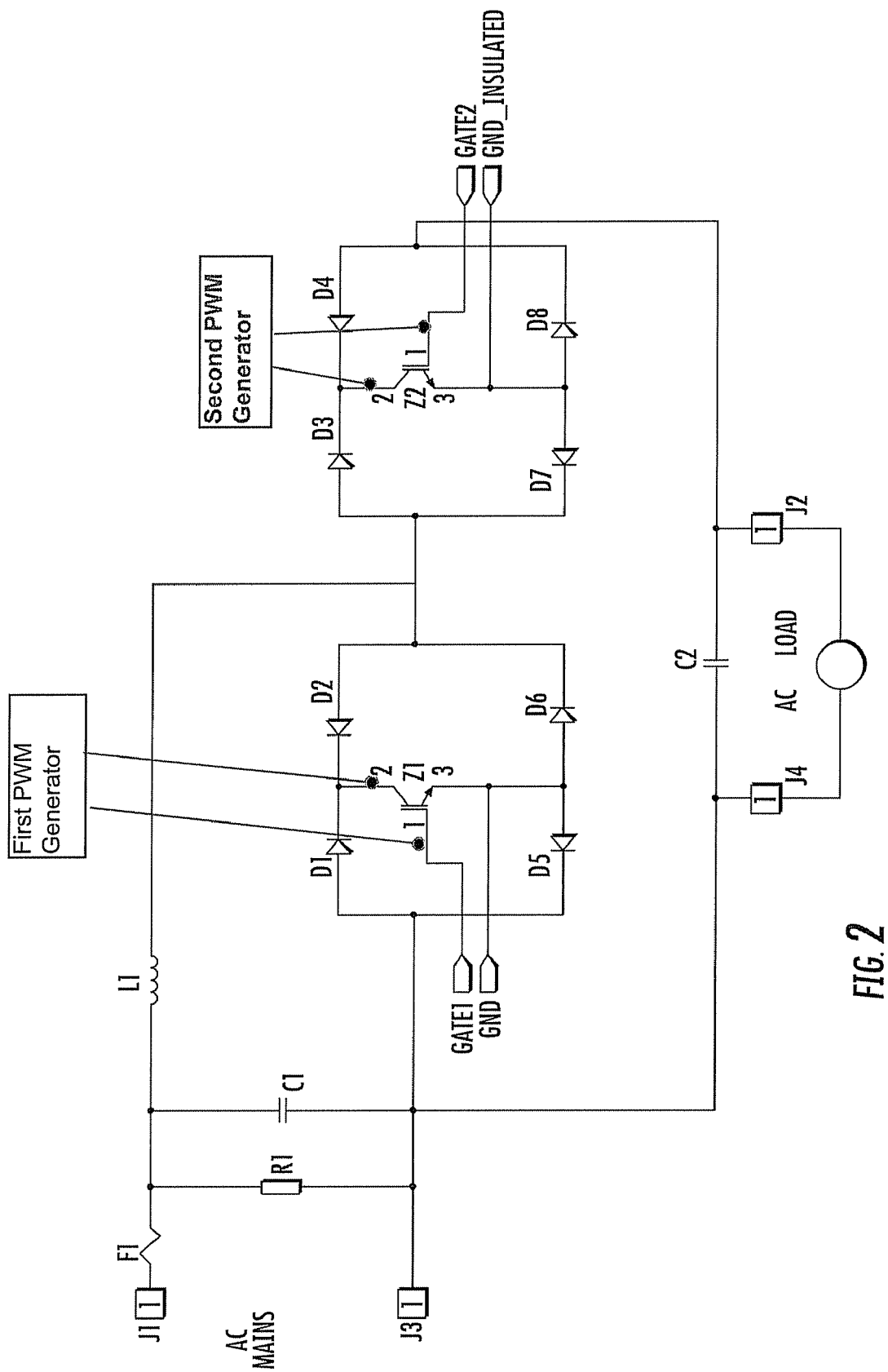
FIG. 2 is a circuit architecture according to an embodiment of an AC-AC voltage booster, in accordance with the present invention.

A circuit architecture according to an embodiment of the AC-AC voltage booster is depicted in FIG. 2. The circuit uses two bidirectional switching devices, for example the two monodirectional switches Z1 and Z2 and the respective bridges of diodes associated thereto, D1, D2, D5, D6 for Z1 and D3, D4, D7, D8 for Z2. The power conversion reactive elements are L1 and C2.

The rightmost block, including the unidirectional switch Z2 and of the diode bridge D3, D4, D7, D8 in which it is connected, is for connecting in series the load and the inductor L1 to the mains during demagnetization phases Toff of the periodic PWM switching signal.

Figure 3:
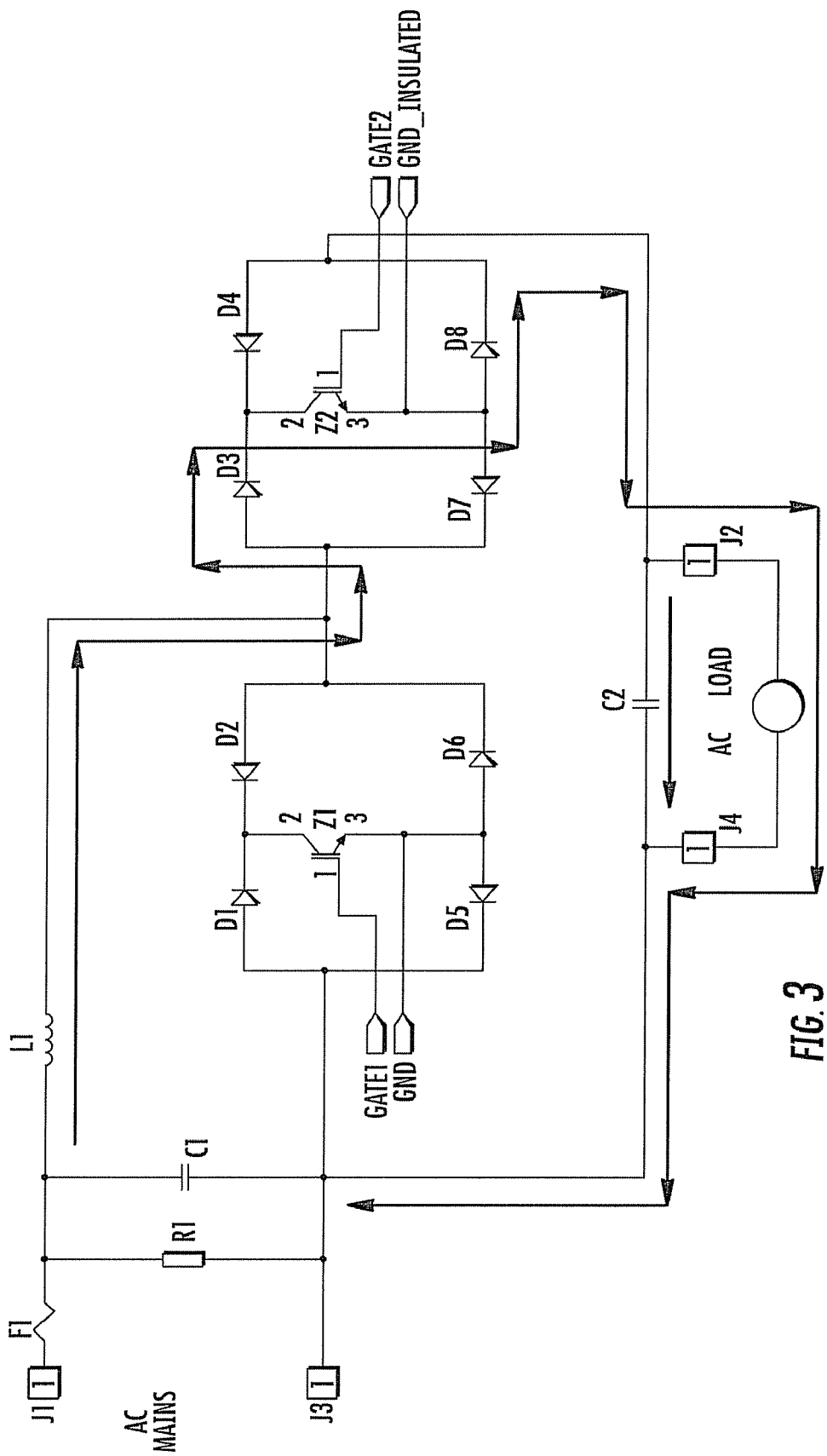
FIG. 3 illustrates the current path during a transfer phase of the stored energy from the inductor to an electric circuit, in accordance with the present invention.

In this phase, energy stored in the magnetic field of L1 during the previous Ton phase, makes the voltage on the nodes of L1 proportional to the first derivative of the current that flows therethrough, the electric path of which is highlighted in FIG. 3 by the arrows (during positive half-waves). The resultant effect is an increase of the voltage on the load and of the input voltage.

Figure 4:
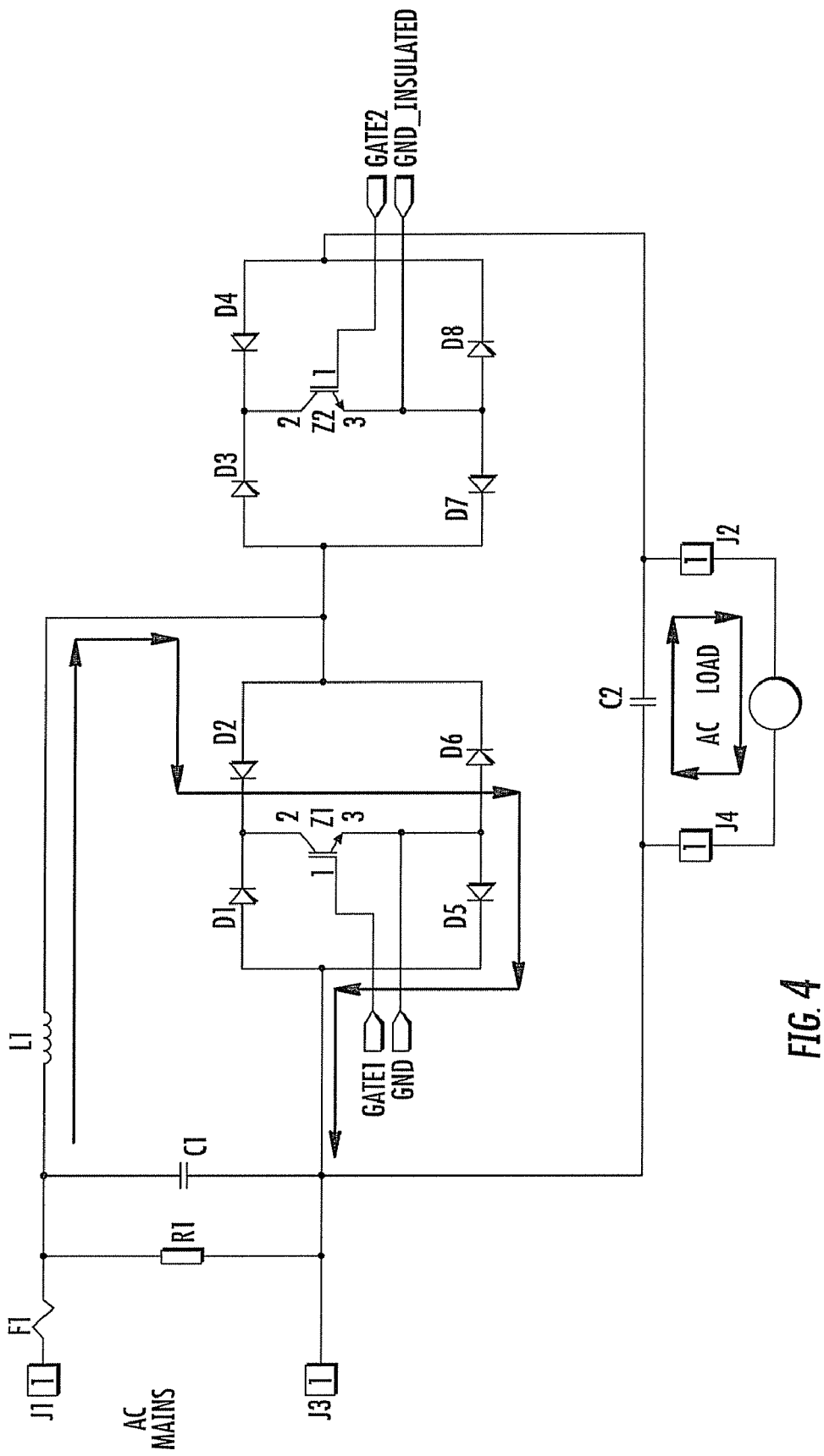
FIG. 4 illustrates the flow path of the current absorbed by the network during the accumulation phase of the energy in the inductor of a circuit, in accordance with the present invention.

The leftmost block, including the unidirectional switch Z1 and the diode bridge D1, D2, D5, D6, charges L1 during Ton phases of the PWM switching signal. The current path for current absorbed by the AC source (during a positive half-wave) is highlighted in FIG. 4 by the arrows. Both during Toff and Ton phases of the PWM cycle, the respective AC circulation paths of the currents in the respective diode bridges associated to the switches Z1 and Z2 are recognizable.

During the Ton phase, the switch Z2 is off and the voltage on the load is kept constant to the charge voltage of the tank capacitor C2. The diodes may have a small recovery time because they are driven by high frequency PWM signals. IGBT or power MOS may be used indifferently as switches Z1 and Z2.

The switches Z1 and Z2 may helpfully be turned on and off in a complementary manner, because a simultaneous turn-on of two switches might reduce the efficiency of the circuit. Therefore, Z2 (that is the power on switch) is controlled by the PWM signal generated by an appropriate PWM generator, and Z1 (free-wheeling switch) is controlled by a complementary signal (inverted replica of the PWM signal).

Figure 5:
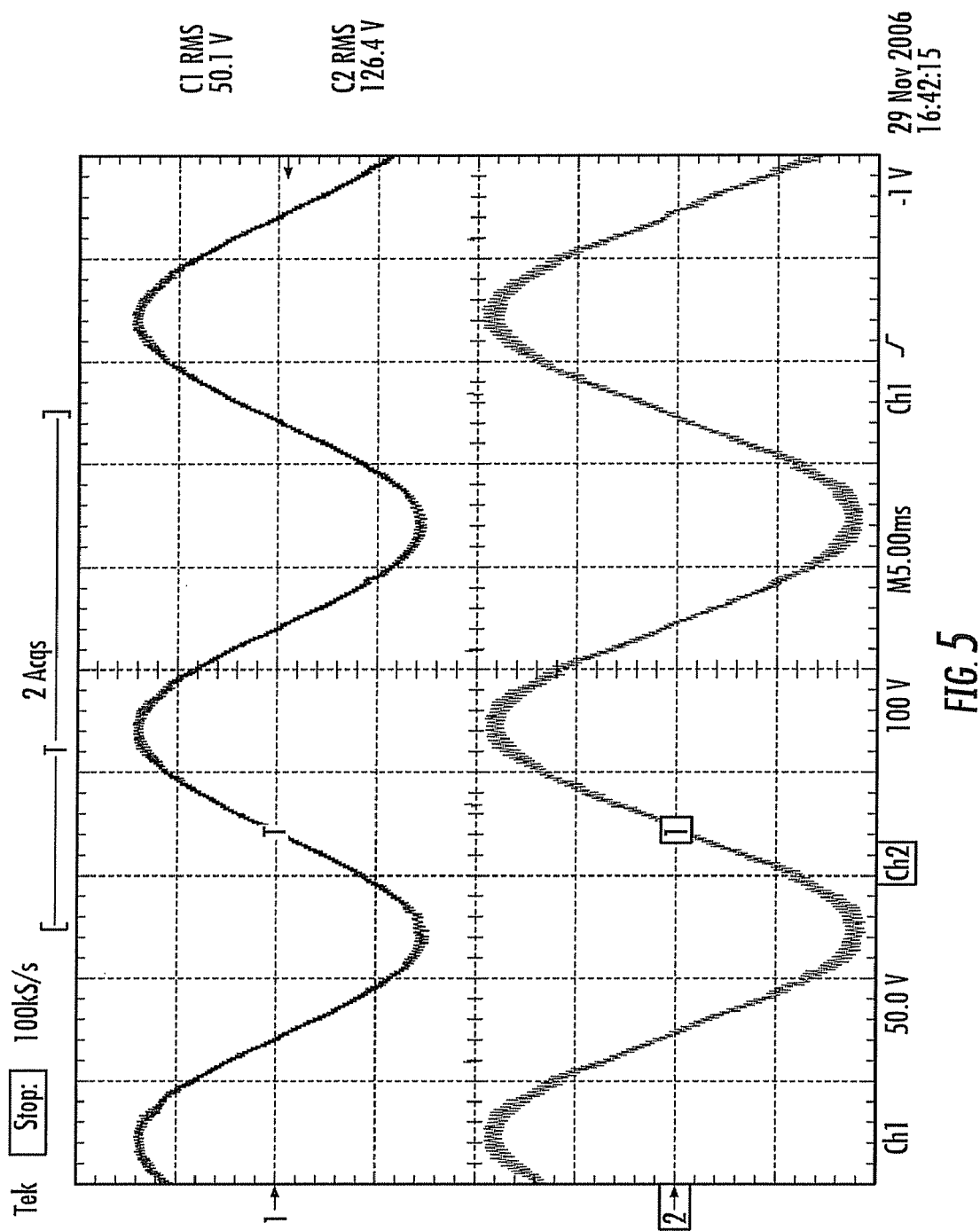
FIG. 5 depicts the waveforms of the AC input voltage and of the AC output voltage, that is the voltage on the nodes of the electric load of the converter, in accordance with the present invention.

FIG. 5 depicts graphs of the AC source voltage (up) and of the output voltage on the load (down) obtained during a test of a prototype of the circuit. The ratio between the output and the input is about 2.5. From equation (1) it is possible to infer that the converter is functioning with a duty-cycle of the PWM signal of about 60%.

Figure 6:
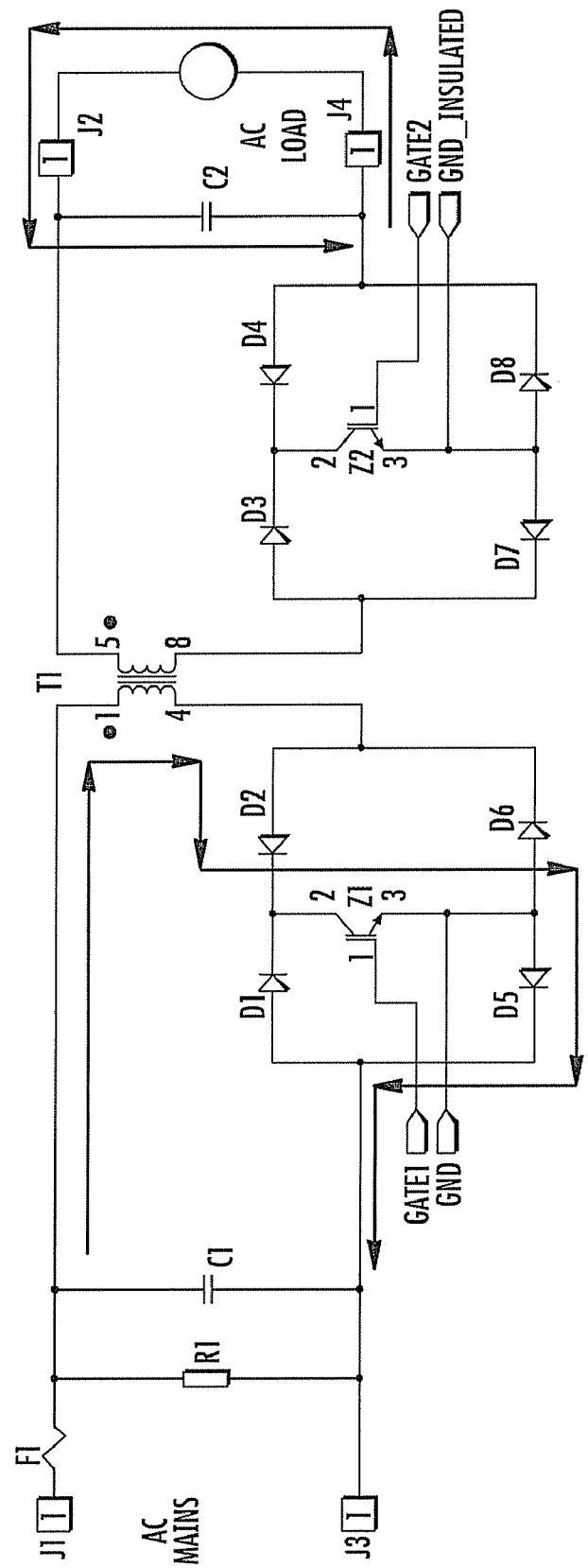
FIG. 6 depicts the electric scheme of an alternative embodiment of an insulated AC-AC voltage booster, with the respective current path during a charge phase of the inductance, in accordance with the present invention.

According to an alternative embodiment shown in FIG. 6, a galvanic or electrical isolation between the output and input is obtained. Isolation may be obtained by introducing a transformer T1, for example with a ferrite core, suitable for functioning at the frequency of the PWM signal. By using an electrical isolation transformer, voltage ratios even beyond the typical limits of a common boost mode functioning of the converter may be obtained.

Indeed, the relation that ties the module of the output voltage with that of the input voltage, if a galvanic decoupling transformer is present, is:

$$v_{output}(t) = \frac{N_2}{N_1} \frac{1}{1-\delta} \cdot V_{max} \cdot \sin(\omega t)$$

wherein $N_1$ and $N_2$ are the number of turns of the primary and of the secondary circuit, respectively. The functioning of the insulated architecture with the transformer during the Ton period of the PWM switching signal is illustrated by the current path (during the positive half-wave) indicated by the arrows in FIG. 6. The magnetization inductance of the primary circuit of T1 stores energy in the magnetic field, similarly to what happens in the inductor L1 of the embodiment of FIG. 3.

Figure 7:
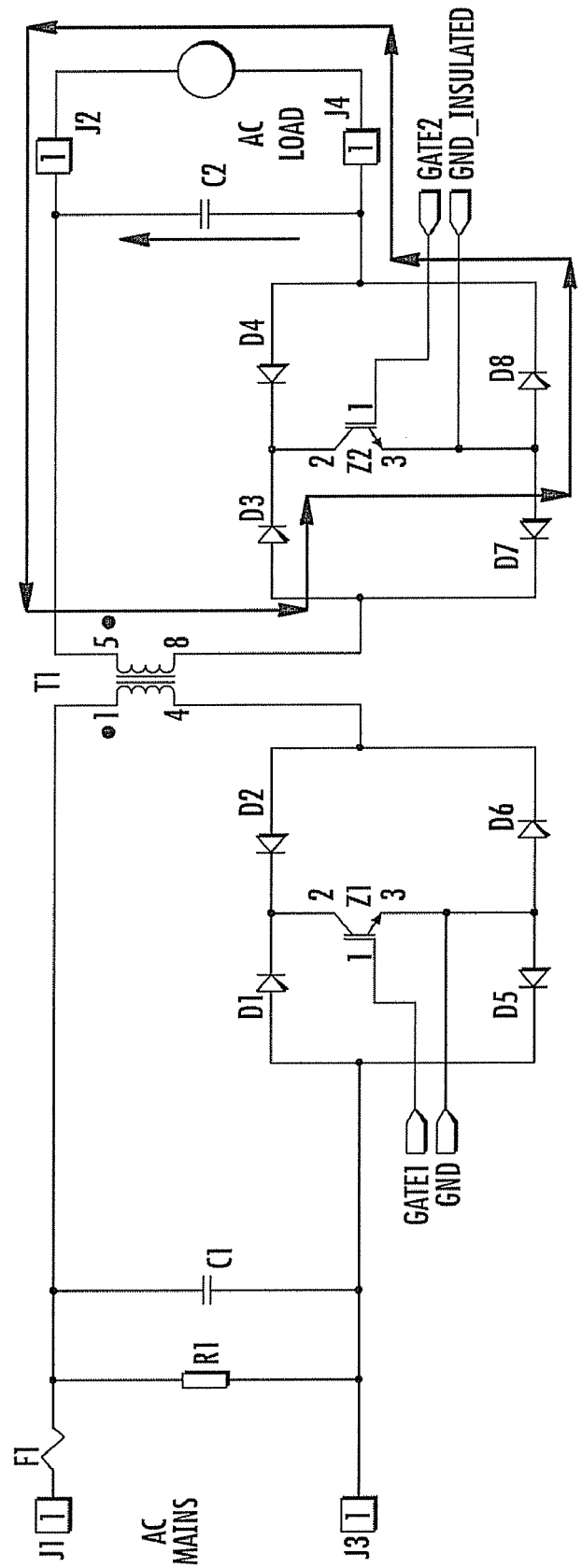
FIG. 7 depicts the electric scheme of the insulated AC-AC voltage booster of FIG. 6, with the respective current path during a discharge phase of the inductance.

During Toff of the PWM switching signal, the energy stored in the magnetic field generated by the previously charged magnetization inductance of the primary circuit of T1, is delivered to the secondary circuit. The circulation path of the secondary current (during the positive half-wave) indicated by the arrows in FIG. 7 may be ensured by the turning on of the bidirectional switching block comprising D3, D4, Z2, D7, D8. In this phase, also a variation of the rms of the charge voltage, that is applied to the primary circuit during the Ton phase depending on the value of the ratio $N_2/N_1$, is obtained.

Figure 8:
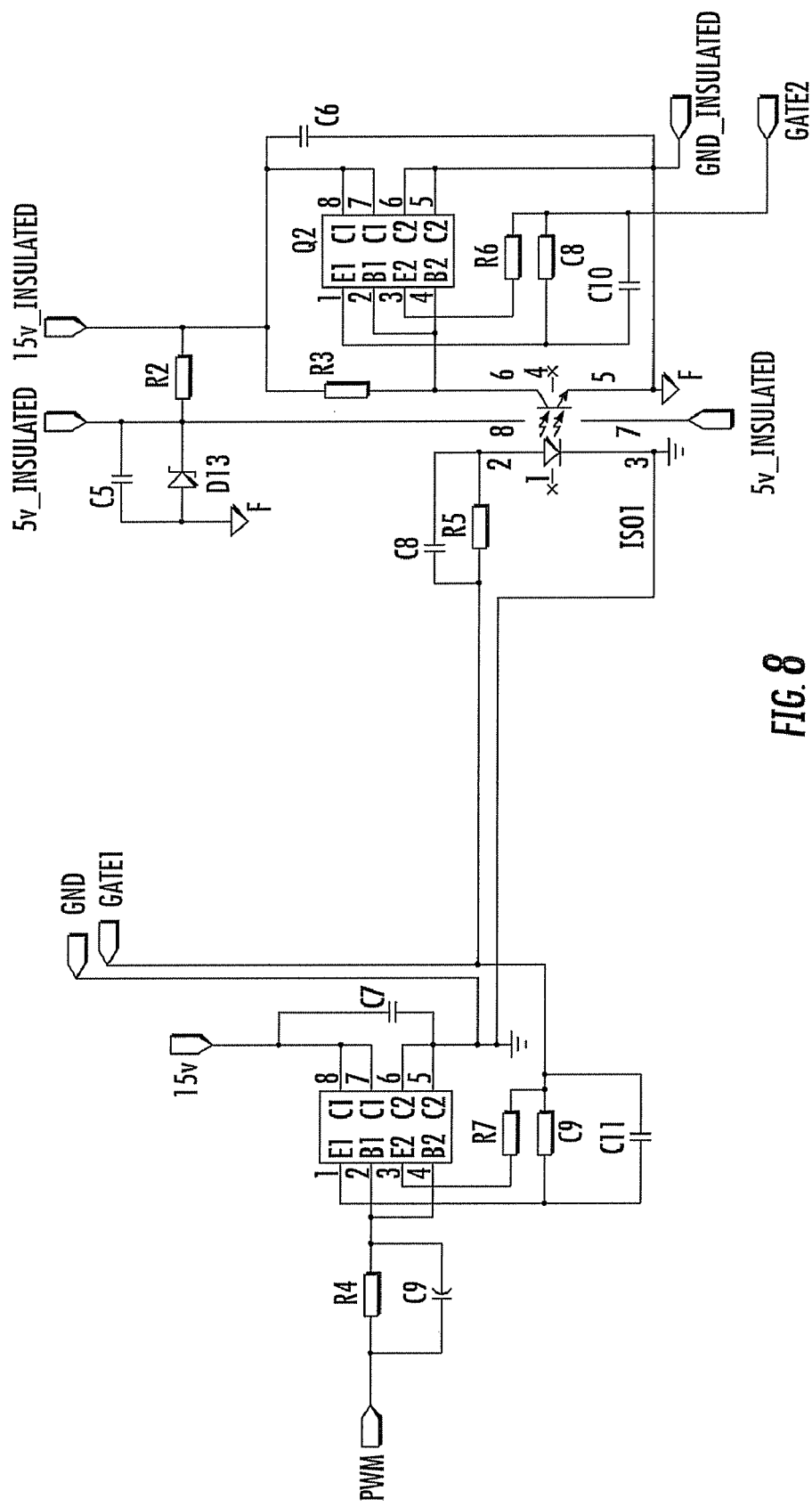
FIG. 8 depicts a possible driving circuit of the two switching devices of an AC-AC voltage booster, in accordance with the present invention.

The alternative circulation paths during the negative half-wave are evident. FIG. 8 depicts a possible embodiment of a driving circuit of the switches Z1 and Z2 suitable also in case of electrical isolation between the input and output.

The source of the PWM control signal with a variable duty-cycle may be implemented with discrete components or with a low cost microprocessor that carries out also the regulation of the output AC voltage. In the illustrated examples, the PWM control signal is provided at the same time to the chip Q1 and to the emitter diode of the high speed photocoupler ISO1.

The chips Q1 and Q2 include a complementary pair of bipolar BJTs arranged in a push-pull configuration for driving correctly the insulated gates of the power devices Z1 and Z2. The external components may be those suggested by the specifications of the chips Q1 and Q2, or they may be immediately identified by any skilled person and will not be described in detail. In particular, in this case the two bipolar transistors, that are used for implementing a push-pull pair, have been substituted for ease of integration with a chip commercially available with the name SO1DTP06 produced by STMicroelectronics.

Because of the common emitter configuration of the output BJT of the opto-isolator ISO1, the output signal Gate2 of the chip Q2 is complementary to the PWM control signal and to the signal Gate1 that drives the switch Z2, as used by the converter. Between the two gate signals there is an electrical isolation for driving correctly the switch Z1, the emitter terminal of which is coupled to a floating potential with respect to a ground potential of the control circuit.

Figure 9:
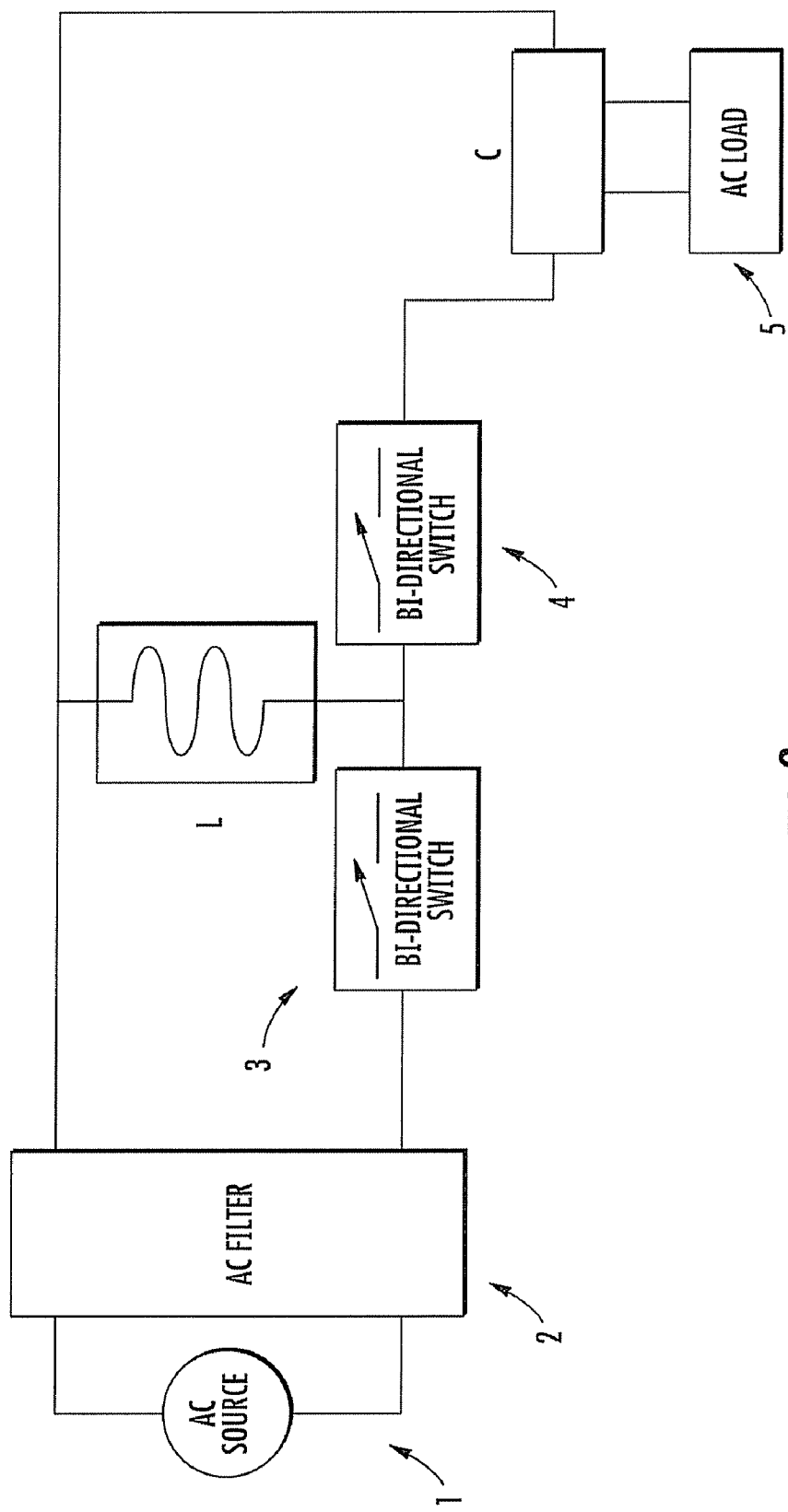
FIG. 9 is a basic architecture of a device for stabilizing an AC voltage, in accordance with another embodiment of the present invention.

Referring to the basic diagram of FIG. 9, it is possible to demonstrate that, neglecting power losses in the electronic devices, the circuit is such that the input (supplied) power S of the circuit equals the output (delivered) power:

$$S = V_{AC(rms)} I_{AC(rms)} = V_{LOAD(rms)} I_{LOAD(rms)}$$

and that the currents satisfy the following relation:

$$\frac{I_{LOAD(rms)}}{I_{AC(rms)}} = \frac{V_{AC(rms)}}{V_{LOAD(rms)}}$$

wherein $V_{AC}$ and $I_{AC}$ represent the input voltage AC SOURCE and the AC current absorbed by the source, respectively, and $V_{LOAD}$ and $I_{LOAD}$ are the output voltage and the output current of the converter, respectively, that are delivered to the load ACLOAD (5). The block (2) may be a low-pass network suitable for filtering switching noise at the frequency of the periodic PWM control signal. Resistive elements responsible of the power conversion are the inductor L and the output capacitor C.

$\delta$ being the duty-cycle that represents the PWM ratio of the switching control signal of the two switches 3 and 4, is given by the following equation:

$$\delta = \frac{ton}{ton + toff} = \frac{ton}{Ts}$$

wherein Ts is the fixed switching period of the PWM control signal, $\phi$ being the phase angle between the voltage and the current, the functioning of the AC-AC converter is described by the following equation:

$$v_{output}(t) = \frac{1}{1-\delta} \cdot V_{max} \cdot \sin(\omega t) \quad (1)$$

From the previous relation, for $\delta=0.5$ (duty cycle equal to 50%) the output voltage has the same amplitude of the input voltage. For $\delta>0.5$ the output voltage is larger than the input voltage.

For $\delta<0.5$ the output voltage is smaller than the input voltage. The voltage transfer ratio, even if it is not linear, is a continuous function in the range of the duty-cycle $(0.1<\delta<0.75)$.

The ratio between the output and the input voltage may vary in the following range:

$$0.1 < \frac{V_{output}}{V_{input}}(t) < 3$$

Similarly, neglecting the power dissipated in the electronic switching devices, it is possible to write the relation that ties the input and output current as:

$$i_{output}(t) = (1-\delta) \cdot I_{max} \cdot \sin(\omega t + \phi) \quad (2)$$

Figure 10:
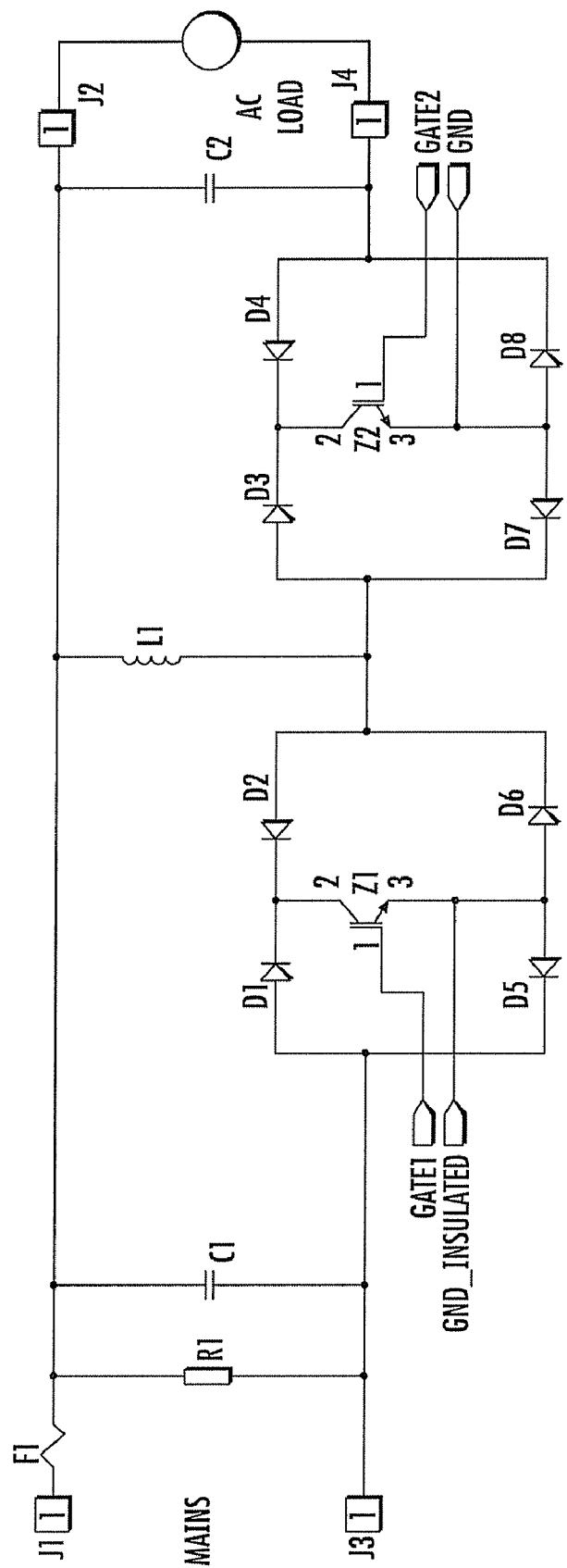
FIG. 10 is a circuit architecture of an AC-AC converter, in accordance with the present invention.

Dividing the input voltage by the current, the equivalent input impedance Zeq of the converter seen from the power source:

$$Z_{eq} = \eta \cdot Z \cdot (1-\delta)^2 \quad (3)$$

wherein $\eta$ is the efficiency of the converter. A circuit architecture according to an embodiment of the AC-AC voltage booster is depicted in FIG. 10.

The circuit uses two bidirectional switching devices including the respective bridges of diodes associated thereto, namely: D1, D2, Z1, D5, D6 and D3, D4, Z2, D7, D8, respectively. The reactive elements for power conversion are L1 and C2.

Figure 11:
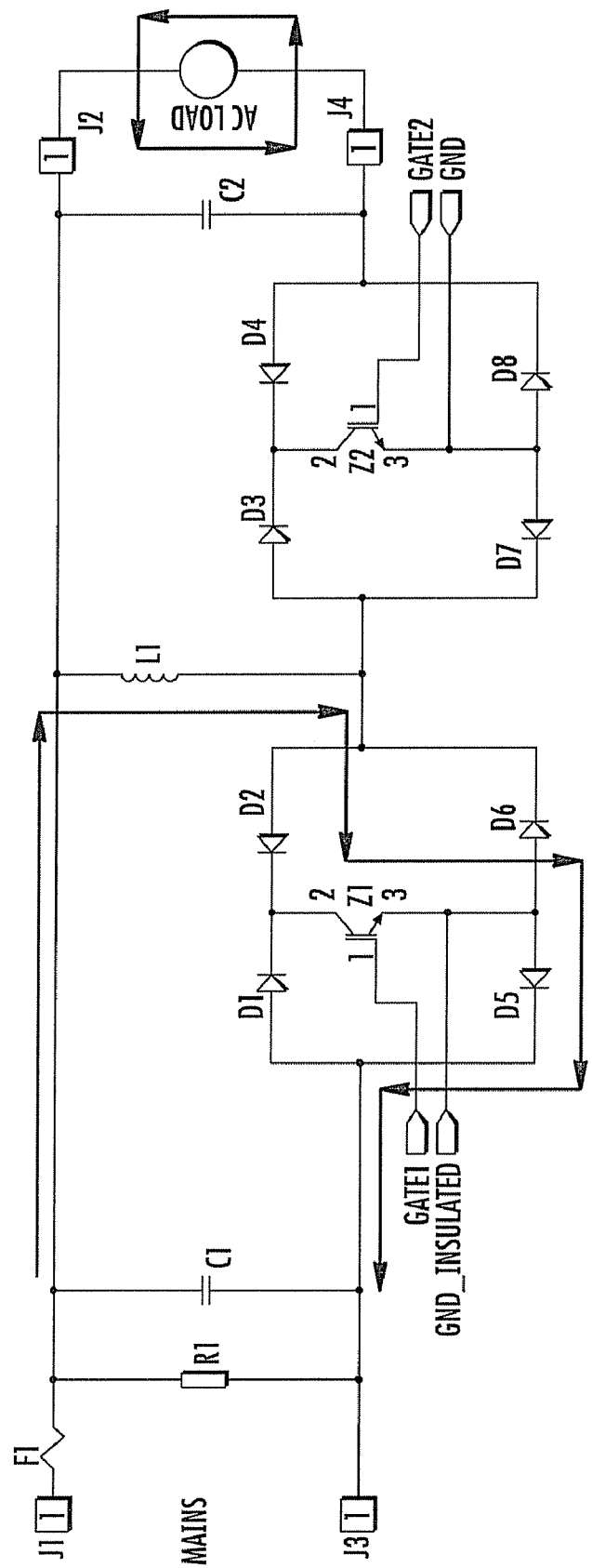
FIG. 11 shows an electric path of the current absorbed by the mains during energy storage phases in the inductor of the circuit, that is during Ton phases of the PWM control signal, in accordance with the present invention.

In the circuit there are two main blocks. The bidirectional switching device on the left side, including the unidirectional switch Z1 and the diodes D1, D2, D5, D6 connects the inductor L1 to the input AC voltage (in the shown example to the connection terminals to the mains), during the magnetization phase that takes place during the Ton phases of the periodic PWM switching signal. FIG. 11 illustrates a current path, indicated by the arrows, during these Ton phases, during a positive halfwave of the mains voltage. The alternative electric path of the current during negative halfwaves of the mains voltage is similarly evident.

Figure 12:
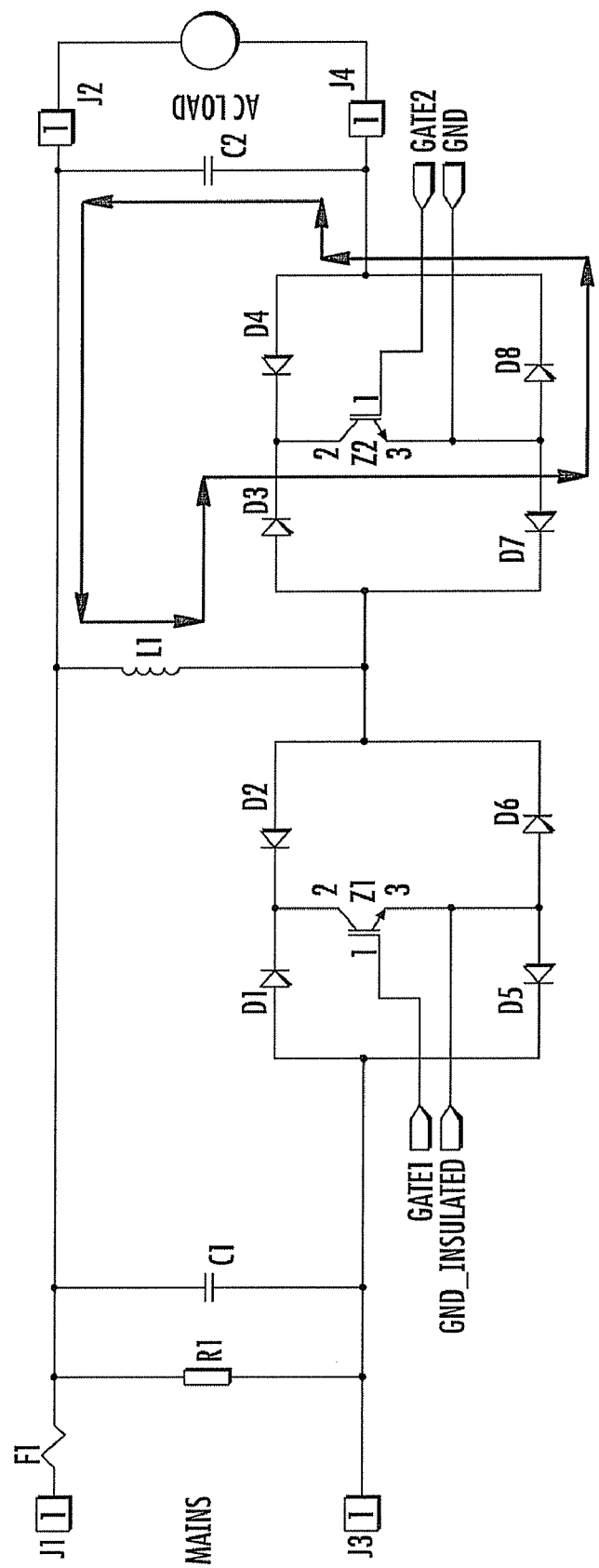
FIG. 12 depicts a current path during transfer phases of the current stored in the inductance to the output capacitor during Toff phases of the PWM control signal, in accordance with the present invention.

The bidirectional switching device on the right, including the unidirectional switch Z2 and the diodes D3, D4, D7, D8 is connected electrically in series with the output capacitor C2, with the eventual electric load connected to the output nodes of the AC-AC converter and with the inductor L1, during the demagnetization phase that takes place during the Toff phase of the periodic PWM switching signal. An electric path of the current during Toff phases during positive consistent halfwaves of the mains voltage is indicated in FIG. 12. The alternative electric path of the current during negative halfwaves of the mains voltage is shown.

The diodes may have a small recovery time because they are driven by high frequency PWM signals. Indifferently, IGBT or power MOS devices may be used as switches Z1 and Z2.

The switches Z1 and Z2 may be turned on and off in a complementary manner, because a simultaneous turn-on of two switches would degrade the efficiency of the circuit. The switch Z1, that is the power on switch, is controlled by the PWM signal generated by an appropriate generator, chosen among the innumerable types of generator known to any skilled person; the switch Z2, that is the free-wheeling switch, is controlled by the complementary PWM signal.

For better explaining the functioning as AC-AC buck-boost converter, let t be a time instant in which the network voltage is positive and non-null. During Ton phases, in which the PWM signal is high, and supposing that transients are elapsed, the switch Z1 is in a conduction state and the current along the arrow path charges the inductance L1 (re: FIG. 11).

During this phase, being Z2 off, the devices D3, D4, D7, D8 and Z2 are not crossed by current. During the time interval Ton during which the inductance is charged, the voltage on the load can be considered constant because it is kept so by the previously charged output capacitor C2.

During Toff phases, in which the PWM signal is low, its complementary signal is high and thus the switch Z2 is in a conduction state (re: FIG. 12). During the Toff interval, Z1 is off and thus no current flows through the diodes D1, D2, D5, D6.

Given that the switching frequency (generally $\geq 20$ kHz) may be larger than the mains voltage, in each instant the above relations hold for the instantaneous values that tie the output voltage to the duty-cycle of the PWM signal applied to the switches. It is thus possible to modulate the instantaneous value of the input mains voltage and it is also possible to vary the rms value of the output voltage by lowering or raising its value depending on the applied duty-cycle ($\delta$).

The circuit may thus function as a step-down or a step-up converter. Moreover, if upon a variation of the rms of the input voltage (for example of the mains voltage) the output voltage is to be kept constant, the circuit may be associated to a common feedback controller that acts on the value of $\delta$ and functions as an Automatic Voltage Control (or more briefly AVC), called also voltage stabilizer.

Because of the bidirectionality of the switching devices of the circuit, the same considerations hold also for negative voltages. During the positive half-wave, the diodes crossed by current, respectively during the Ton and Toff are: D2 and D5 during Ton and D3 and D8 during Toff.

Similarly, during the negative half-wave, the diodes crossed by current, respectively during Ton and Toff are: D1 and D6 during Ton, D4 and D7 during Toff. The circuit may not need an output LC filter. Indeed, during the Toff period, in which Z2 is in a conduction state, the inductance L1 is connected to the same output node to which also the capacitor C2 is connected, thus realizing a LC low-pass filter.

By acting on the duty-cycle ($\delta$) of the control signal, it is possible to adjust the rms of the output AC voltage. The circuit, as stated above, because of the possibility of operating in buck-boost mode, is suitable for realizing stabilizers of the mains voltage for ensuring a constant output voltage after relevant variations of the mains voltage.

Figure 13:
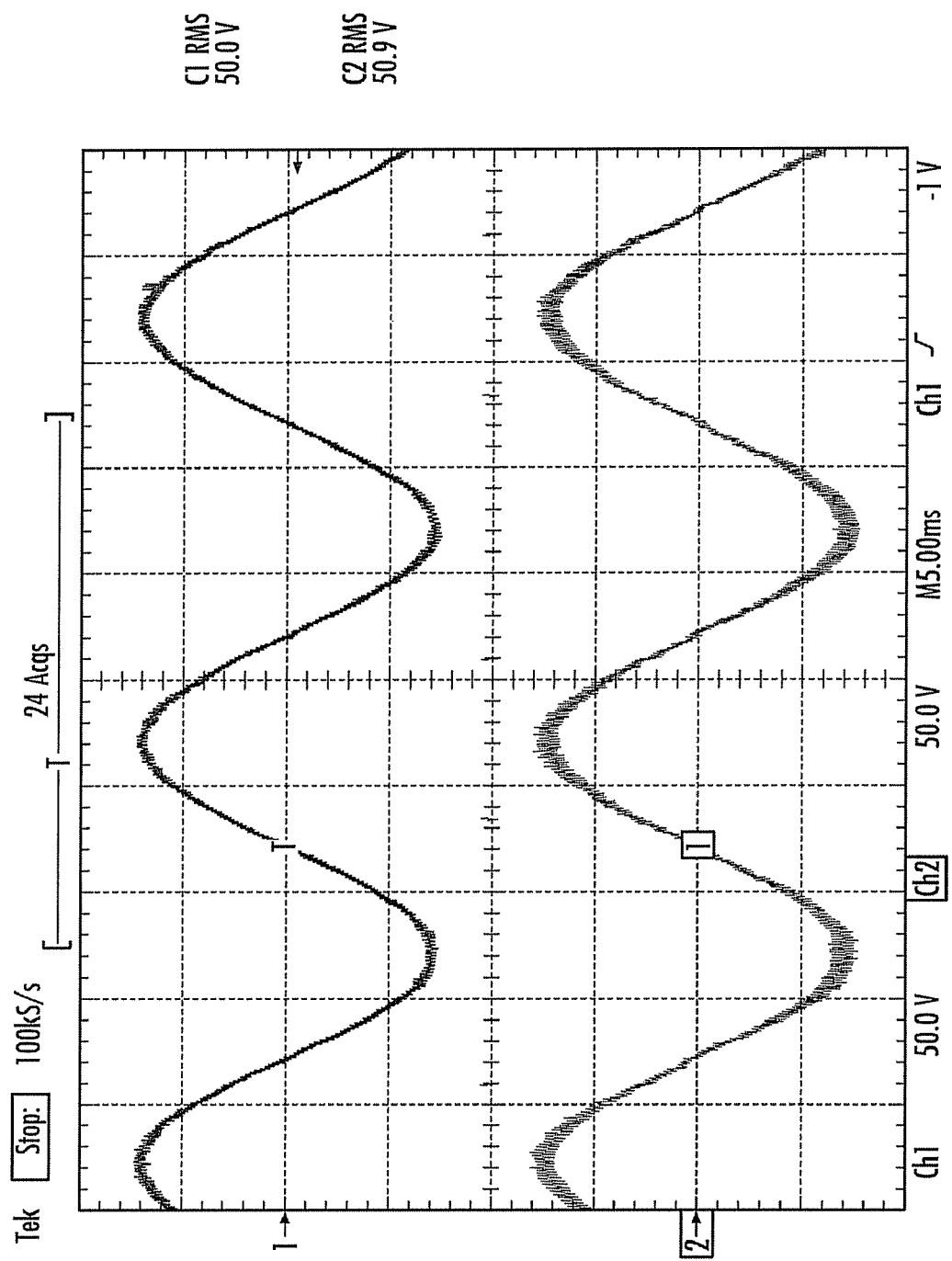
FIGS. 13, 14 and 15 depict waveforms of the input AC voltage and of the output AC voltage of the converter, in accordance with the present invention.
Figure 14:
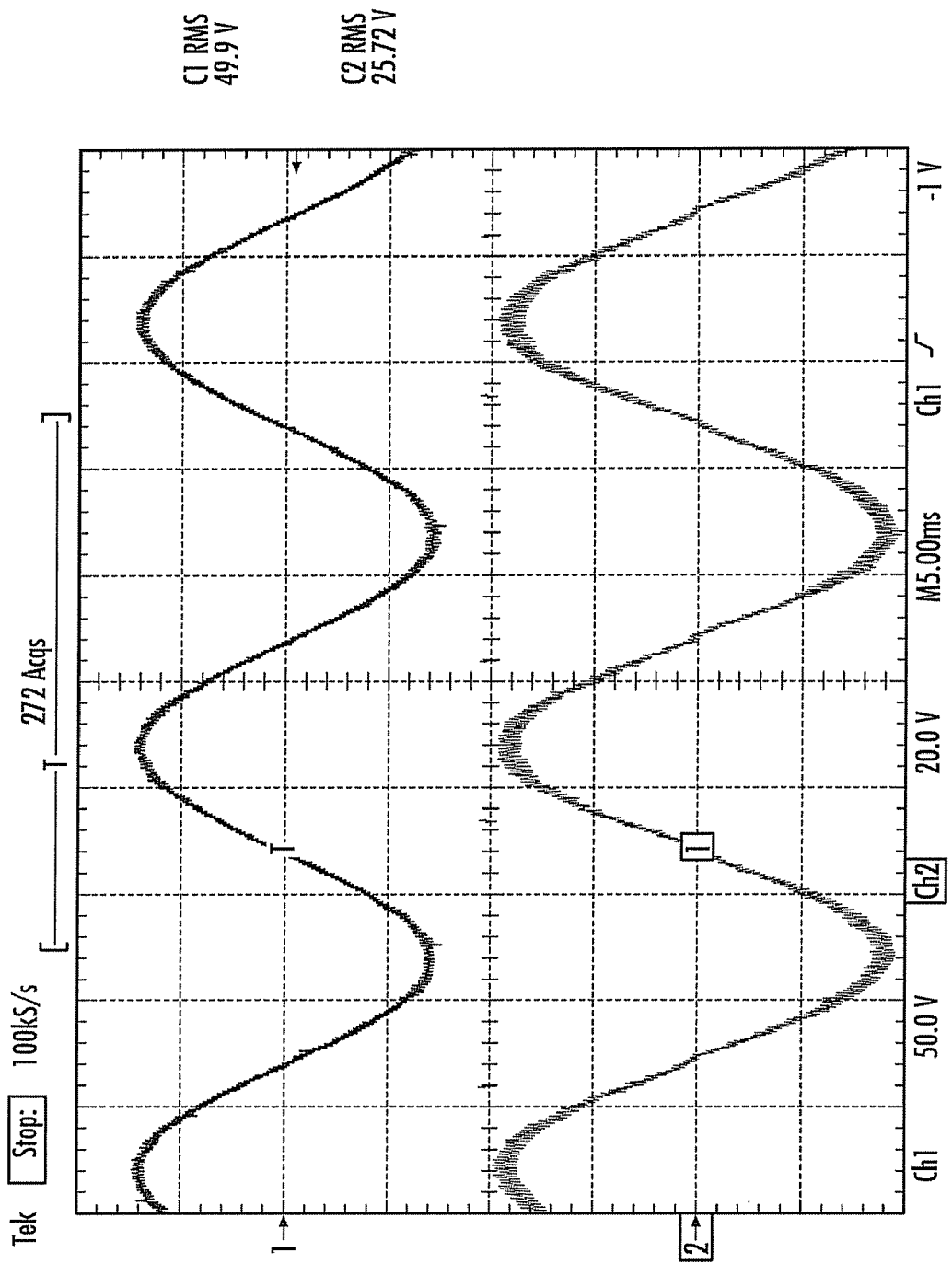
Figure 15:
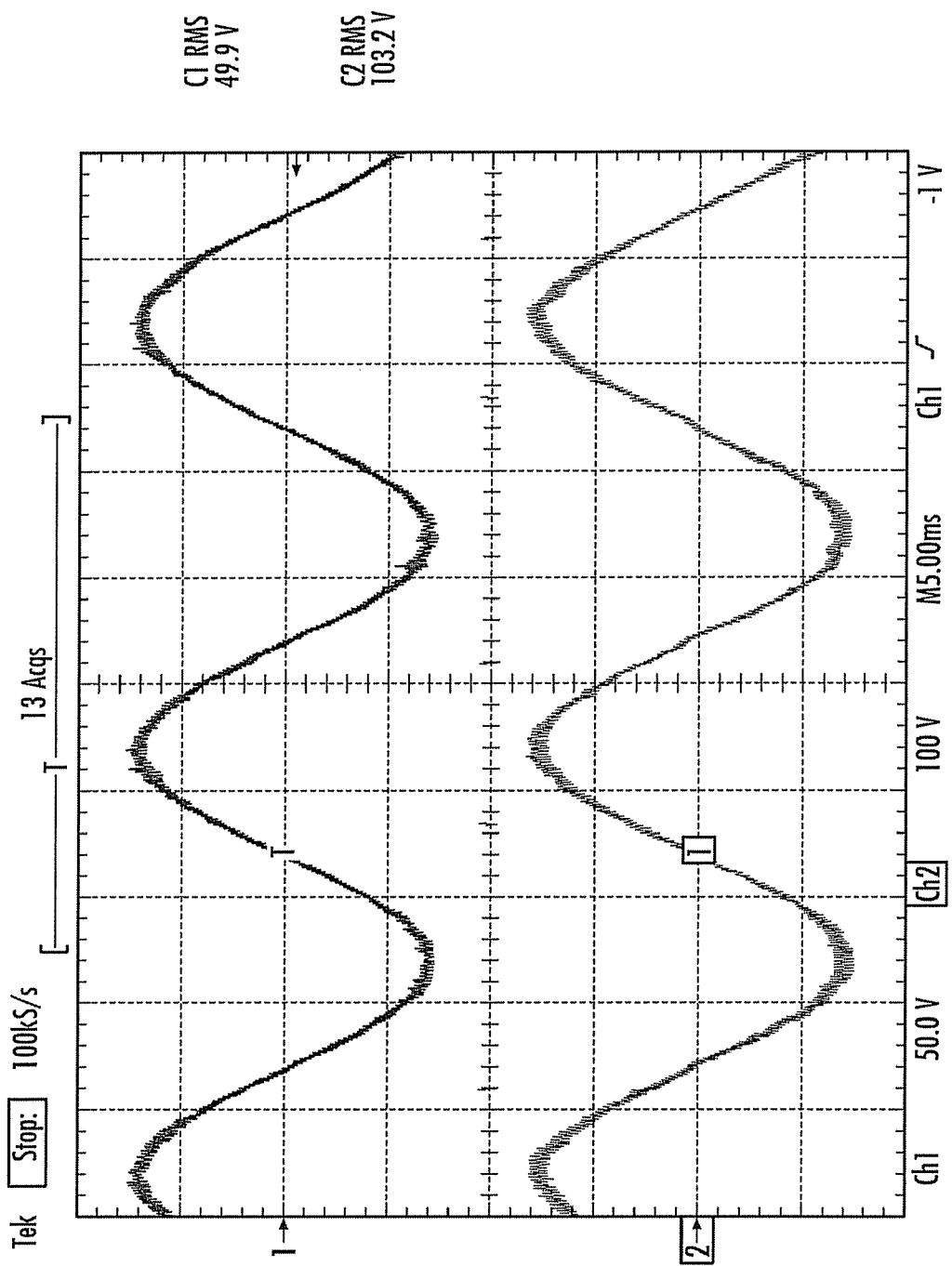

FIGS. 13 to 15 depict waveforms of the input and output voltages, obtained with a test prototype functioning with different duty-cycles ($\delta$). As it is possible to infer from the waveform of FIG. 13, the output voltage may be equal to the input voltage. Indeed, the duty-cycle is 50%.

FIG. 14 refers to the case in which the circuit works as a step-down, thus outputting a voltage that is half the input voltage. In this case, as it is possible to infer from the above relations, the duty-cycle ($\delta$) is about 33%. FIG. 15 refers to the case in which the circuit works as a step-up converter, outputting an AC voltage twice the input voltage. In this case, the duty-cycle ($\delta$) is about 67%.

The invention claimed is:

1. A device to be coupled to a primary AC voltage and an electric load, the device comprising:
    an input;
    a generator to generate at least one PWM control signal;
    an inductive element to be coupled to said input;
    a capacitor to be coupled in parallel to the electric load and coupled to the input;
    a first bidirectional switch to couple the electric load and the primary AC voltage during a conduction phase;
    a second bidirectional switch to discharge energy from the electric load during an off phase of said first bidirectional switch;
    a first driving circuit for said second bidirectional switch to be input with the at least one PWM control signal and to generate a first PWM signal to be applied between a control terminal and a conduction terminal of said second bidirectional switch;
    a second driving circuit for said first bidirectional switch input with the at least one PWM control signal and to generate a second PWM signal, in phase opposition with respect to the first PWM signal, to be applied between a control terminal and a conduction terminal of said first bidirectional switch; and
    an electric decoupling circuit between said generator and said second driving circuit.

2. The device of claim 1, further comprising a low-pass filter coupled to said input.

3. The device of claim 1, wherein said inductive element comprises an inductor.

4. The device of claim 1, wherein said inductive element is a part of an electric decoupling transformer to insulate an input of the device from an output of the device.

5. The device of claim 1, wherein each of said first and second bidirectional switches comprises a monodirectional switch and a full-bridge diode stage coupled thereto.

6. The device of claim 5, wherein said monodirectional switch comprises at least one of a power MOS and an IGBT device.

7. The device of claim 1, wherein the generator, inductive element, capacitor, first and second bidirectional switches, first and second driving circuits, and the electric decoupling circuit define a device for transforming a primary AC voltage into a higher output AC voltage for supplying an electric load.

8. The device of claim 1, wherein the generator, inductive element, capacitor, first and second bidirectional switches, first and second driving circuits, and the electric decoupling circuit define an AC stabilizer.

9. A method of limiting current peaks during switching transients of a double AC-AC chopper comprising an input, a generator to generate at least one PWM control signal, an inductive element to be coupled to the input, a capacitor to be coupled in parallel to the electric load and coupled to the input, a first bidirectional switch to couple the electric load and the primary AC voltage during a conduction phase, a second bidirectional switch to discharge energy from the electric load during an off phase of the first bidirectional switch, a first driving circuit for the second bidirectional switch to be input with the at least one PWM control signal and to generate a first PWM signal to be applied between a control terminal and a conduction terminal of the second bidirectional switch, and a second driving circuit for the first bidirectional switch input with the at least one PWM control signal and to generate a second PWM signal, in phase opposition with respect to the first PWM signal, to be applied between a control terminal and a conduction terminal of the first bidirectional switch, the method comprising:
    electrically decoupling the generator and the second driving circuit.

10. The method of claim 9, further comprising a low-pass filter coupled to the input.

11. The method of claim 9, wherein said inductive element comprises an inductor.

12. The method of claim 9, wherein said inductive element comprises a part of an electric decoupling transformer to insulate an input of the device from an output of the device.

13. The method of claim 9, wherein each of said first and second bidirectional switches comprises a monodirectional switch coupled to a full-bridge diode stage.

14. The method of claim 13, wherein said monodirectional switch comprises at least one of a power MOS and an IGBT device.

15. The method of claim 9, wherein the double AC-AC chopper defines a device for transforming a primary AC voltage into a higher output AC voltage for supplying an electric load.

16. The method of claim 9, wherein the double AC-AC chopper defines an AC stabilizer.

* * * * *